United States Patent Office 3,257,637
Patented June 21, 1966

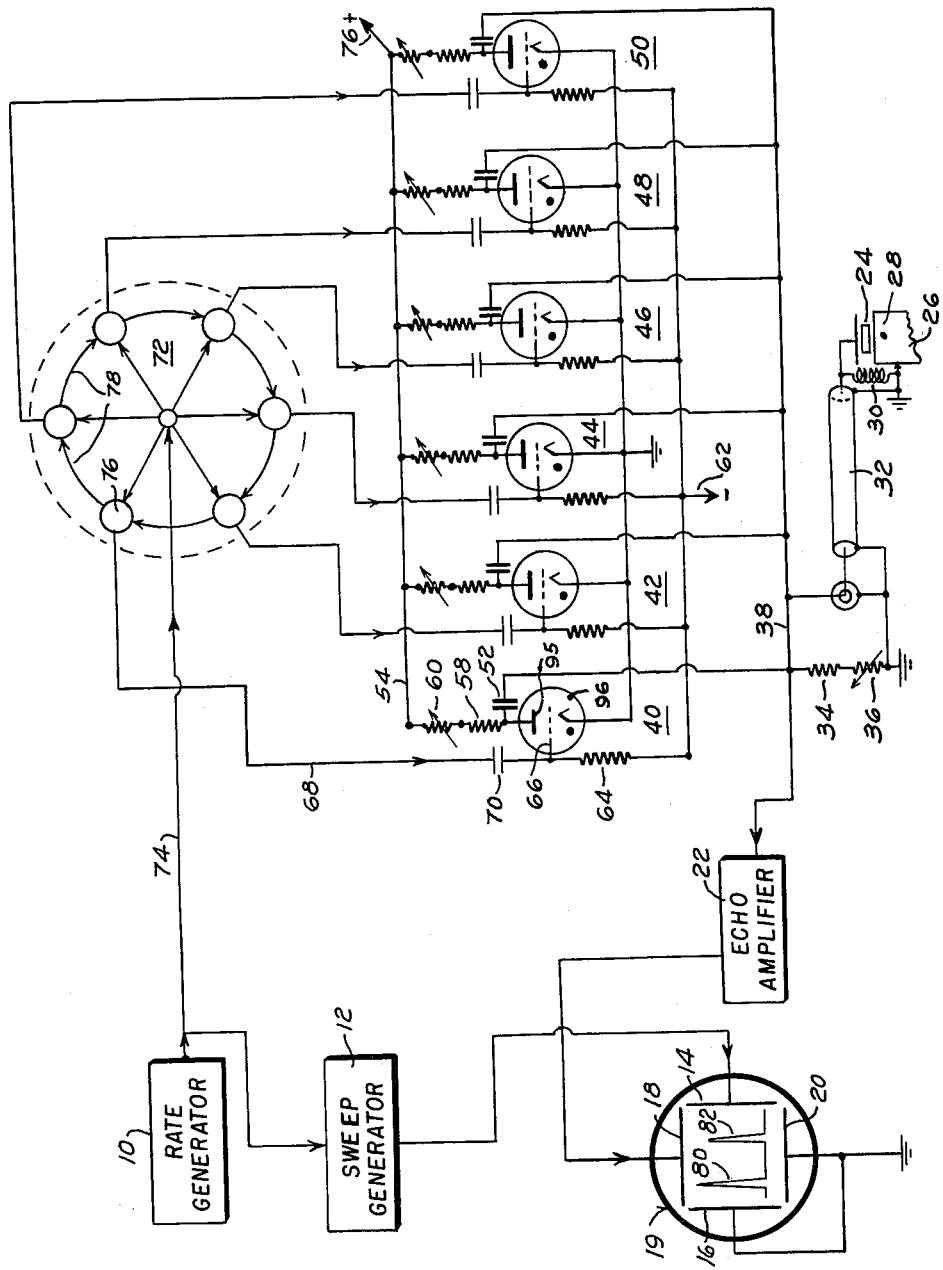

3,257,637
HIGH SCAN RATE ULTRASONIC INSPECTION SYSTEM
Elliott A. Henry, Newtown, Conn., assignor, by mesne assignments, to Branson Instruments, Incorporated, Stamford, Conn., a corporation of Delaware
Filed Nov. 20, 1962, Ser. No. 238,930
5 Claims. (Cl. 340—1)

This invention pertains to ultrasonic inspection systems of the kind in which workpieces are scanned by rapidly repeated probing pulses of acoustic compressional wave energy, and the returning echoes or responses are displayed or analyzed to yield information as to the location or size of discontinuities such as defects or other features of the workpiece.

The rapidly repeated probing or "interrogating" pulses used in such systems are generally furnished by the shock-excitation of a tank circuit into which is suddenly discharged, by a switch circuit or device, the stored energy of a charged capacitor. Each probing pulse thus consists of a short damped wave train whose decrement depends on the resistance present in the "ringing" circuit including the tank inductance, the capacitance of the transducer and the associated wiring, and any shunt or damping resistance purposefully included for adjusting the decrement.

As is well known in the art, high operational efficiency requires that the impedance of the switch device, when in its conducting or "on" state, be very low, so that the stored energy applied to the tank circuit shall be delivered suddenly to the tank circuit. While a mechanical switch could be used for the purpose (as is done in some welding supply circuits, for example), the provision of rapidly repeated pulses requires a switch device capable of faster action. The typical switch device used is a gas-filled tube of the thyratron type, which provides good efficiency at modest cost for repetition rates up to several hundred pulses per second, and will operate at rates as high as a thousand per second at reduced efficiency.

As also well known, thyratrons (and all of the equivalent thyratron-like devices suitable for use in systems with which the present invention is concerned, such as 4-layer semiconductor diodes, silicon-controlled rectifiers and the like) have the property that once they are rendered conductive under control of the grid electrode, conduction will continue out of control by the grid, until the conduction (anode-cathode) current has been reduced to a very small value which is insufficient to support plasma formation (in the case of the thyratron example). Since in the simplest and preferred arrangement the storage capacitor remains connected across the charging voltage source at all times, and essentially connected across the space discharge path of the thyratron, the latter must include sufficient resistance to limit the thyratron space current, after discharge, to a small enough value to allow conduction to cease. Otherwise, the storage capacitor could never regain a substantially full charged condition.

At the same time, the presence of this minimum value of resistance in the space current path of the thyratron sets a limit to the rate at which recharging current from the charging source can flow into the storage capacitor. In a practical case, the attainment of a 95 percent charged condition necessitates a charging time of about three times the pulse interval, and imposes a serious limitation upon the repetition rate at which interrogation pulses can be supplied to the search transducer. Conventional transducers are capable of operation at much higher rates. In this connection, it is to be noted that the recharge time required is affected not only by the value of the series resistance in the charging circuit, but also by the capacitance of the storage condenser. Since a high value of condenser capacitance is desired for ample energy storage and good charge-transfer efficiency, both the resistive and capacitive parameters work towards a large value for the re-charge time constant, which is equal to R multiplied by C, where the time constant is expressed in seconds if the resistance is in ohms and the capacitance is in farads.

It is accordingly a principal object of the present invention to overcome the above limitation of known circuits of this type, and to do so without losing the efficiency, economy and operating simplicity provided by the employment of thyratrons (or thyratron-like devices) therein.

The invention achieves its objects, in essence, by providing duplicate or multiple thyratron-and-condenser components arranged to be discharged seriatim to the (single) probing transducer and tank circuit, together with a simple sequential switching circuit for controlling the discharge sequence. All of the storage condensers are, as in the known circuits, continually connected for the flow of recharging current from the charging source, and the available recharge time is therefore multiplied by the number of duplicate thyratrons provided. The extent to which the pulse repetition rate can be raised by this technique is not limited to the factor of three mentioned above, because by employing six, ten or even more duplicate units, the available recharge time for each condenser can be made long enough to permit the use of an increased value of the current-limiting (deionization) resistance, and hence a faster return of the thyratrons to their non-conducting state. An increase in interrogation pulse repetition rate of from five to ten or more times is readily achieved.

The invention will now be described in detail in connection with a specific illustrative example shown in the accompanying drawing, which is a partly schematic diagram thereof.

Referring now to the drawing, reference numeral 10 designates the conventional rate generator or pulse-output oscillator 10 which produces timing control pulses at the desired repetition rate for the production of probing pulses. The rate generator output is connected to control the usual sweep (sawtooth) generator 12 whose output energizes the horizontal-deflection plates 14, 16 (or equivalent coils) of the cathode ray tube indicator 19. The vertical-deflection plates 18, 20 are coupled to the echo signal output of echo amplifier 22.

Echo amplifier 22 has its input connected to the probing transducer (crystal) 24 which is mechanically coupled to one face of the workpiece 26. A typical defect, void or inclusion in the workpiece is indicated at 28. The resonant tank circuit of transducer 24 is constituted mainly by inductance 30 and the aggregate capacitance of the transducer itself, the coaxial cable 32 and the distributed capacitance of the circuit. The damping factor is established by resistors 34 and 36, the latter being adjustable to vary the damping effect through a range of which resistor 34 establishes a fixed limiting damping factor.

As well known in the art, the tank circuit is shocked into oscillation by each energy pulse arriving at conductor 38, producing a damped wave train whose decrement is established by the circuit "Q" under the control of the damping resistors. The energy pulses on conductor 38 hence also produce the desired "probing" pulse trains of ultrasonic compressional wave energy from transducer 24.

In prior known arrangements, conductor 38 would be energized at a maximum repetition rate of a few hundred pulses per second by the repeated charge-discharge cycle of a condenser controlled by a thyratron tube triggered from the rate generator 10. As indicated above, this rate is limited by the charging time of the condenser and the de-ionizing time of the thyratron.

To avoid such limitation on the probing pulse rate, the invention provides a plurality of thyratrons, each with its individual energy-storing condenser, and arranges for their sequential discharge to conductor 38, to provide the desired multiplication of the repetition rate while affording ample time for condenser and thyratron cycling. In the system chosen for illustration, six such thyratron stages (40, 42, 44, 46, 48 and 50) are shown, but more or fewer can be employed as required. Since the stages are all identical, only stage 40 is described in detail.

The energy storage and discharge device of stage 40 is condenser or capacitor 52, connected to the junction of anode 95 (of thyratron 96) and resistor 58. A second resistor 60 is in series with 58 and the positive terminal of a D.C. supply source 76 whose other terminal is grounded. The other terminal of capacitor 52 is connected to the conductor 38 leading to transducer 24. The charging rate of the condenser 52 is established by series resistors 58 and 60, the latter being preferably an adjustable trimmer to allow precise equalization of the charging rates of all the stages, and hence equalization of the pulse amplitudes thereof.

The grids or trigger electrodes of all the thyratron tubes are normally biased below tube cut-off by a negative supply voltage from bias source 62 applied through grid resistors, such as resistor 64 in the case of the first stage. This hold-off bias voltage is overcome momentarily, once during each operating cycle, by a positive pulse applied to the grid 66 over conductor 68 and coupling condenser 70. As the thyratron is thus rendered conductive, and its anode-cathode impedance suddenly reduced to a very low value, the energy stored in capacitor 52 is suddenly discharged into the tank circuit as described, shock-exciting it and the transducer 24 to produce the probing pulse.

It is apparent that since each thyratron stage can independently produce the desired probing pulses, sequential firing of these stages will permit the repetition rate to be multiplied by the number of such stages (herein six) without in any way shortening the time available for thyratron recovery or condenser re-charging.

Such sequential firing is conveniently obtained by means of the commutator action of the ring counter generally designated by numeral 72, and comprising a plurality of binary on-off or flip-flop stages so interconnected that only one stage at a time can be in its "on" condition, and so that the turning "off" of that stage conditions the succeeding stage to be turned "on" by the next rate pulse from the output line 74 of rate generator 10. The number of binary stages in the commutator is made equal to the number of thyratron stages, and the pulse output from each binary stage is applied to the grid coupling condenser of the corresponding thyratron. For example, the output of binary stage 76 is applied to conductor 68 and condenser 70 of thyratron stage 40. The input to all the binaries is common, at lead 74, and the binary-cycling interconnections are indicated at 78. The only requirement on the binary commutator, besides adequate trigger output voltage level, is that the transfer time shall be sufficiently short to ensure sequential triggering of the thyratrons at the desired rate. This requirement is a very simple one, since ring counters of either vacuum tube or transistor construction commonly operate at megacycle rates.

The prior art affords numerous examples of both vacuum tube and transistor ring counter or commutating circuits. Typical forms are shown in U.S. Patent 2,848,628 of Altschul, and in Part 7 of Military Standardization Handbook MIL-HDBK-215 (Navy Department, June 15, 1960).

Any equivalent commutating device of adequate speed can be used in place of the ring counter 72; for example, a decade (or other) counting tube such as Retma type 6476A can be substituted.

The presentation shown on the screen of oscilloscope 19 is merely illustrative; for example, of an entry face echo 80 followed by a pip 82 corresponding to the workpiece defect 28.

While the invention has been described herein in connection with a particular specific embodiment in which the commutating means is a multistage ring counter whose individual stages trigger the successive thyratrons under the timing control of a rate generator, the invention can also be carried out by other arrangements. The commutation, or distribution of triggering pulses to the individual thyratrons (or similar trigger devices) could thus be accomplished by substituting a delay line for the ring counter, such delay line being tapped at $n$ equi-time points along its length and the tap points being electrically connected through disconnect diodes to the trigger electrodes of the trigger devices. Such a delay line could be either electrical or acoustic, and in either case the initial input pulse to the line would be derived from a rate generator producing pulses at intervals spaced $n$ times as far apart as the desired time intervals between probing pulses. In such a modification, the equality of spacing between the probing pulses would require careful equalization of the delay times corresponding to the succeeding tap points, which equalization adjustments are unnecessary in the preferred embodiment. Moreover, the suggested modification would not be amenable to selection of different probe pulse repetition rates.

It will be realized that various such changes may be made within the true spirit of the novel aspects of the invention, and it is not intended to exclude any such modifications as fall within the scope of the appended claims.

What is claimed is:

1. An ultrasonic reflection pulse testing system, comprising a rate generator having an operating frequency determining a desired repetition rate for interrogating pulses, a compressional wave output transducer for coupling ultrasonic pulses into a workpiece, a tank circuit connected to said transducer to discharge pulse trains of energy thereto, a plurality of energy storage and discharge devices connected to said tank circuit, an adjustable resistor in series with each of said devices for equalizing the charging time constants thereof, a charging source connected to all of said devices through their respective series resistors, and means controlled by said rate generator for causing said devices to discharge sequentially into said tank circuit at the desired repetition rate; the discharge time constant of each of said devices into said tank circuit being substantially smaller than the interval between successive cycles of said rate generator, whereby the transducer is energized by successive independently occurring equal-amplitude discrete pulses from the respective devices.

2. The system in accordance with claim 1, in which said energy storage devices are capacitors.

3. The system in accordance with claim 2, in which the means controlled by said rate generator comprises an individual trigger-controlled gas discharge tube having its space-discharge path connected across a respective one of said capacitors.

4. The system in accordance with claim 3, in which the means controlled by said rate generator further includes a multi-stage commutator having each stage output connected to the trigger electrode of a respective one of said discharge tubes.

5. An ultrasonic pulse testing system of the type having a charging source, capacitor means for storing energy for pulse-application to a transducer, and electric discharge means for recurrently discharging said capacitor means to said transducer, said system being capable of producing probing pulses at a rate several times greater than the limit normally established by the finite recharge time of said capacitor means and the cut-off recovery time of said discharge means, said system comprising:

(a) a plurality of energy-storage capacitors connected through respective adjustable charging-rate equalizing resistors between the charging source and one terminal of said transducer, (b) a corresponding plurality of trigger-type discharge devices respectively connected between the other terminal of said transducer and those terminals of said capacitors connected to said charging source, and (c) commutating means for sequentially triggering said discharge devices to accomplish the sequential transfer of stored energy from said capacitors to said transducer, (d) the discharge time constant of each of said devices into said transducer being substantially smaller than the interval between successive cycles of said commutating means, whereby the transducer is energized by successive independently occurring equal-amplitude discrete pulses from the respective devices.

References Cited by the Examiner
UNITED STATES PATENTS

| | | | |
|---|---|---|---|
| 2,375,830 | 5/1945 | Spencer | 328—67 X |
| 2,895,080 | 7/1959 | Branker | 315—24 X |
| 2,915,635 | 12/1959 | Rockafellow et al. | 328—62 |
| 3,022,851 | 2/1962 | Hasbrook | 181—0.5 |
| 3,038,328 | 6/1962 | Henry | 73—67.9 |
| 3,051,906 | 8/1962 | Haynes | 328—61 X |
| 3,105,950 | 10/1963 | Harris | 340—1 |

CHESTER L. JUSTUS, *Primary Examiner.*

R. A. FARLEY, *Assistant Examiner.*